United States Patent [19]

Luepke et al.

[11] Patent Number: 5,265,432
[45] Date of Patent: Nov. 30, 1993

[54] OIL PURIFYING DEVICE FOR USE WITH A REFRIGERATION SYSTEM

[75] Inventors: Gary L. Luepke; Allen J. Dietrich, both of La Cross, Wis.

[73] Assignee: American Standard Inc., New York, N.Y.

[21] Appl. No.: 939,177

[22] Filed: Sep. 2, 1992

[51] Int. Cl.⁵ .................................................. F25B 43/02
[52] U.S. Cl. ...................................... 62/84; 62/470; 62/472; 159/901
[58] Field of Search ............... 62/84, 468, 470, 471, 62/472; 159/901

[56] References Cited

U.S. PATENT DOCUMENTS

| | | | |
|---|---|---|---|
| 2,701,684 | 2/1955 | Hirsch | 62/468 |
| 3,304,741 | 2/1967 | Weller | 62/472 |
| 3,705,499 | 12/1972 | Mount et al. | 62/84 |
| 3,777,509 | 12/1973 | Muench | 62/470 |
| 4,208,883 | 6/1980 | Stirling | 62/192 |
| 4,249,389 | 2/1981 | Mayer | 62/192 |
| 4,359,329 | 11/1982 | Willeitner | 55/186 |
| 4,364,236 | 12/1982 | Lower et al. | 62/77 |
| 4,403,645 | 9/1983 | MacCracken | 165/10 |
| 4,441,330 | 4/1984 | Lower et al. | 62/149 |
| 4,617,808 | 10/1986 | Edwards | 62/472 |
| 4,646,527 | 3/1987 | Taylor | 62/85 |
| 4,698,983 | 10/1987 | Hechavarria | 62/292 |
| 4,755,657 | 7/1988 | Crim et al. | 219/536 |
| 4,862,699 | 9/1989 | Lounis | 62/84 |
| 4,872,316 | 10/1989 | Browne et al. | 62/129 |
| 4,906,264 | 3/1990 | Szymaszek et al. | 55/324 |
| 4,939,903 | 7/1990 | Goddard | 62/77 |
| 4,942,741 | 7/1990 | Hancock et al. | 62/292 |
| 4,959,965 | 10/1990 | Browne et al. | 62/129 |
| 4,967,570 | 11/1990 | Van Steenburgh, Jr. | 62/292 |
| 4,969,495 | 11/1990 | Grant | 141/98 |
| 4,998,416 | 3/1991 | Van Steenburgh, Jr. | 62/292 |
| 5,036,679 | 8/1991 | Zlobinsky et al. | 62/470 |
| 5,042,271 | 8/1991 | Manz | 62/473 |
| 5,062,277 | 11/1991 | Heitmann et al. | 62/193 |
| 5,086,621 | 2/1992 | Starner et al. | 62/84 |

FOREIGN PATENT DOCUMENTS

| | | | |
|---|---|---|---|
| 9119140 | 12/1991 | PCT Int'l Appl. | 62/470 |
| 2231133 | 11/1990 | United Kingdom | 62/84 |

Primary Examiner—Henry A. Bennet
Assistant Examiner—William C. Doerrler
Attorney, Agent, or Firm—William J. Beres; William O'Driscoll; Peter D. Ferguson

[57] ABSTRACT

An oil purification apparatus for use in conjunction with a refrigeration system. The oil purification apparatus includes an isolation tank for receiving a quantity of contaminated oil from the refrigeration system and holding the oil isolated from the refrigeration system. A separation system including a heater and an agitation mechanism reclaims refrigerant contaminant entrained in the oil. A vapor loop selectively conveys the reclaimed refrigerant from the oil purification apparatus to the refrigeration system.

13 Claims, 2 Drawing Sheets

OIL PURIFYING DEVICE FOR USE WITH A REFRIGERATION SYSTEM

TECHNICAL FIELD

This invention relates to an oil purifying apparatus for use with a refrigeration system. More particularly, it relates to an oil purifying apparatus that removes refrigerant contaminant from lubricating oil used in the refrigeration system.

BACKGROUND OF THE INVENTION

A refrigeration system typically functions in a continuous cycle, reusing the refrigerant in the system. Three pieces of equipment, an evaporator, compressor, and condenser connected in a loop, are used in the cycle. In the evaporator, cold liquid refrigerant is warmed absorbing heat from a medium to be cooled. As the liquid refrigerant temperature is raised, the liquid refrigerant is evaporated, forming a warm refrigerant vapor. The refrigerant vapor is then piped to the compressor. The compressor mechanically compresses the refrigerant vapor to raise the pressure of the vapor thereby lowering the temperature at which the refrigerant vapor will condense. The hot refrigerant vapor is piped to the condenser where the hot vapor is cooled. This cooling changes the refrigerant back to the liquid state. The liquid refrigerant is then piped back to the evaporator, where the cycle begins over again.

There are many different designs of compressors. All compressors, however, in one way or another, mechanically compress the refrigerant vapor. This mechanical action requires moving parts and the moving parts require lubricating oil.

In a hermetic compressor, lubricating oil is constantly in contact with refrigerant in the compressor of a refrigeration system when the refrigeration system is in operation In some types of compressors, the oil is deliberately mixed with refrigerant in order to cool the compressor components. In other types, the intermixing of the oil and refrigerant is a function of refrigerant blowing by piston rings and the like. Over time, the oil becomes contaminated with entrained refrigerant and with various substances in the refrigeration system such as metal filings and corrosion byproducts This contamination reduces the ability of the oil to lubricate the compressor Additionally, aside from the problem of the reduction in lubricating capability due to entrained refrigerant, the oil must be periodically changed much as in an automobile engine. It is undesirable to have refrigerant contaminant in the oil when the oil is drained from the refrigeration system as it is now known that many types of refrigerant pose a danger to the environment.

It has been well known that oil contamination of refrigerant (as opposed to refrigerant contamination of oil) is a problem, particularly in maintaining the efficiency of a refrigeration system. Devices have accordingly been devised that successfully cleanse the refrigerant of entrained oil. Such devices do not address the problem of residual refrigerant that is left entrained in the oil.

The refrigerants utilized in virtually all current refrigeration systems contain chlorofluorocarbons, which includes chlorine as a key element. It is now known that such refrigerants play a role in the condition referred to as "global warming". Responsive to this, the Montreal Protocol, adopted in 1987, mandated a fifty percent cut in chlorofluorocarbon production by the turn of the century Further regulation by the Clean Air Act of 1990 has moved the phaseout date to zero production by the year 2000. In the interim, it is desirable to continue to utilize existing compressor designs with existing refrigerants while, at the same time, minimizing the release of refrigerant vapor to the atmosphere. Refrigerant entrained in oil that has been drained from a refrigeration system ultimately vaporizes and escapes to the atmosphere. Further, when certain levels of refrigerant entrained in the oil are reached, the oil is classified as hazardous waste. Such classification requires the implementation of stringent and costly disposal methods.

A system for removing substantially all the entrained refrigerant contaminant from the lubricating oil of a refrigeration system would have decided advantages. The purified oil could be removed from the refrigeration system with low refrigerant emissions, or could be forceably pumped into another storage vessel. Oil that is to be drained from the system would be in a readily recyclable condition, would not require handling as a hazardous waste, and would not pose the threat of release of refrigerant vapor to the atmosphere.

SUMMARY OF THE INVENTION

The present invention is an oil purification apparatus that substantially removes entrained refrigerant contaminant from lubricating oil used in a refrigeration system.

The oil purification apparatus hereof includes an isolation tank coupled to a refrigeration system for receiving a quantity of contaminated oil from the refrigeration system and holding the oil in isolation from the refrigeration system. A separation system is coupled to the tank for heating and agitating the oil to substantially purify the contaminated oil and reclaim the entrained refrigerant. A vapor loop is provided between the tank and the refrigeration system for selectively conveying the reclaimed refrigerant vapor from the tank to the refrigeration system.

It is an object of the present invention to remove oil that is contaminated with entrained refrigerant from a refrigeration system and substantially purge the oil of the entrained refrigerant.

It is a further object of the present invention to remove oil from a "charged" refrigeration system with minimal release of refrigerants.

It is a further object of the present invention to purify oil removed from a refrigeration system so that the oil does not comprise a hazardous waste.

It is a further object of the present invention to purify oil removed from a refrigeration system so that upon removal, the oil does not pose a threat to the environment due to the release of entrained refrigerant from the oil.

It is a further object of the present invention to provide an oil purification device that is not permanently attached to the refrigeration system.

The present invention provides an oil purification apparatus for use in conjunction with a refrigeration system. The refrigeration system includes an evaporator where liquid refrigerant is evaporated to refrigerant vapor, a compressor for pressurizing the refrigerant vapor, and a condenser for condensing pressurized refrigerant vapor to liquid refrigerant. The compressor has interacting moving parts and a quantity of lubricating oil for the lubrication thereof. The oil is intermixed with the refrigerant during operation of the refrigeration system such that the refrigerant becomes entrained therein providing contaminated oil within the refrigeration system. The oil purification apparatus includes (1) isolation means, selectively and operably coupled to the refrigeration system, for receiving a portion of the quantity of contaminated oil therefrom and isolating the portion of the contaminated oil from the refrigeration system; (2) separation means, operably coupled to the isolation means, for substantially purifying the contaminated oil and reclaiming the entrained refrigerant by causing the entrained refrigerant to vaporize and separate from the contaminated oil providing reclaimed refrigerant vapor; and (3) vapor loop means, selectively and operably coupling the isolation means to the refrigeration system, for selectively conveying the reclaimed refrigerant vapor from the isolation means to the refrigeration system.

The present invention also provides a method of purifying contaminated oil for use in a refrigeration system. The refrigeration system includes an evaporator where liquid refrigerant is evaporated to refrigerant vapor, a compressor for pressurizing the refrigerant vapor, and a condenser for condensing pressurized refrigerant vapor to liquid refrigerant. The compressor having interacting moving parts and a quantity of lubricating oil for the lubrication thereof. The oil intermixing with the refrigerant during operation of the refrigeration system such that the refrigerant becomes entrained therein presenting the contaminated oil. The oil purification method comprises the steps of: removing a quantity of contaminated oil from the refrigeration system to a sealed vessel and isolating the vessel from the refrigeration system; heating the contaminated oil within the vessel to cause vaporization of the entrained refrigerant thereby providing reclaimed refrigerant vapor within the vessel; evacuating the reclaimed refrigerant vapor from the sealed vessel by pumping the reclaimed refrigerant vapor therefrom; and returning the reclaimed refrigerant vapor to the refrigeration system.

The present invention further provides an oil purification device for a refrigeration system which includes an evaporator and a compressor. The oil purification device comprises conduit, operably connected to the compressor, for removing a refrigerant containing lubricant mixture from the compressor; and conduit, operably connected to the evaporator, for returning a refrigerant vapor to the evaporator. The oil purification device also comprises an isolation tank, operably connected to the removing conduit and the return conduit, for receiving the lubricant mixture; and means, associated with the isolation tank, for purifying the lubricant mixture by boiling off the refrigerant and directing the resulting refrigerant vapor to the returning conduit.

DETAILED DESCRIPTION OF THE DRAWINGS

Figure 1:
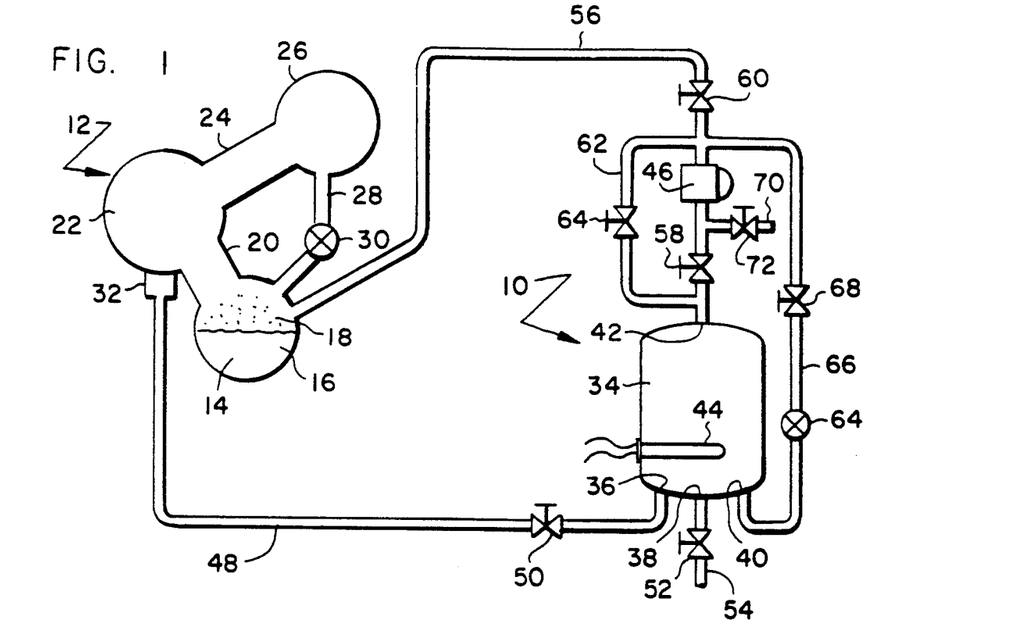
FIG. 1 is a schematic depiction of the oil purification apparatus in accordance with the invention shown in conjunction with a typical refrigeration system.

FIG. 1 is a schematic representation of the oil purification system 10 in accordance with the present invention connected to a typical refrigeration system 12. U.S. Pat. Nos. 4,223,537 to Sanborn et al. and 4,081,971 to Eber, commonly assigned to the assignee of the present application, are examples of such a typical refrigeration system and are hereby incorporated by reference. The refrigeration system 12 has three main components interconnected in series for cyclic operation. The first component is an evaporator 14. Cold liquid refrigerant flows through a heat exchanger device (not shown) in the evaporator 14. Warm fluid, either water or air, circulated from a space to be cooled, flows across the heat exchange device, thermally interacting with the cold liquid refrigerant. As the fluid is cooled, the liquid refrigerant is warmed to a temperature at which it evaporates into refrigerant vapor. This action is depicted in FIG. 1 by showing a lower, liquid portion 16 of the evaporator 14 and an upper, vapor portion 18 of the evaporator 14.

The warm refrigerant vapor is drawn from the evaporator 14, through a pipe 20 to a compressor 22. The compressor 22 mechanically compresses the warm refrigerant vapor, causing an increase in the pressure of the refrigerant vapor. The compressed refrigerant vapor is then pumped via a pipe 24 to a condenser 26.

The condenser 26 is a second heat exchanger. Cool water or air, usually brought in from outside the building in which the refrigeration system 12 is installed, thermally interacts with the hot refrigerant vapor in the condenser 26, lowering its temperature and causing the refrigerant vapor to condense to a liquid state.

The liquid refrigerant is pumped via a pipe 28 through a restrictor 30 to the evaporator 14. The restrictor 30 acts to reduce the pressure of the liquid refrigerant. As the liquid refrigerant enters the evaporator 14 it is in a cold state, ready to again absorb heat from the fluid circulated from the space being cooled.

The compressor 22 may be one of a number of known configurations. In all such configurations the compressor 22 provides mechanical compression of refrigerant vapor. To perform this compression, the compressor 22 is powered by an external source (not shown) and comprises a number of interacting, moving parts, such as a radial impeller. Such moving parts require lubrication and cooling. Accordingly, lubricating oil is pumped through the compressor 22. An oil pump (not shown) picks up the oil from an oil sump 32 for distribution through the compressor 22. The lubricating oil is cooled and temporarily held in a sump 32. When the refrigeration system 12 is not in operation, substantially all of the oil in the compressor 22 drains by gravity to the sump 32.

The oil purification system 10 broadly includes an isolation vessel to hold the contaminated oil in isolation from the refrigeration system 12, heating and agitating apparatus to separate the entrained refrigerant from the oil, and conduits and valving to introduce and evacuate refrigerant vapor and oil from the vessel.

The isolation vessel comprises an isolation tank 34. The tank 34 is a sealed unit that can be isolated from the surrounding environment. The tank 34 includes lowermost oil port 36, a drain port 38, and an agitation port 40. A vapor port 42 is located in the uppermost portion of tank 34.

An oil heater 44 is preferably disposed internally of the tank 34 by surface mount or other means. The oil heater 44 may be externally mounted on the tank 34 but must then generate sufficient extra heat so as to overcome heat loss in penetrating the tank wall. The oil heater 44 is positioned so as to be in thermal contact with oil retained in the tank 34 for heating of the oil upon energization of the heater 44.

A vapor pump 46 is located external to the tank 34. In the preferred embodiment, the piping configuration is such that the vapor pump 46 is a unidirectional pump whose configuration allows the pump 46 to put vacuum or pressure at various points on the tank 34. As depicted in FIG. 1, the vapor pump 46 pumps vapor in a direction from the vapor port 42 of the tank 34 to either the evaporator 14 or the agitation port 40, depending on the configuration of the system valves.

A series of conduits and valves interconnect the tank 34 and the vapor pump 46 with each other and with the refrigeration system 12 in order to selectively configure the oil purification system 10 for the various functions that it must perform.

In particular, a conduit 48 interconnects the sump 32 of the compressor 22 to the oil port 36 of the tank 34. A valve 50 is carried by the conduit 48 for selectively conveying a refrigerant containing lubricant, such as oil, from the sump 32 to the isolation tank 34. A valve 52 is carried by a drain conduit 54 for selectively draining oil from the tank 34 through the drain port 38

A vapor return conduit 56 extends from the vapor port 42 of the tank 34 to the vapor portion 18 of the evaporator 14 of refrigeration system 12. The vapor pump 46 is carried along the vapor return conduit 56. The vapor return conduit 56 also includes a valve 58 between the vapor port 42 and the vapor pump 46, and a valve 60 between the vapor pump 46 and evaporator 14.

A conduit 62 provides a loop around the vapor pump 46. Referring to FIG. 1, a first end of the conduit 62 is connected to the vapor return conduit 56 between the tank 34 and the valve 58. A second end of the conduit 62 is connected to the vapor return conduit 56 between the vapor pump 46 and the valve 60. A valve 64 is carried by the conduit 62

A conduit 66 extends between the vapor return conduit 56 and the agitation port 40 of the tank 34. A first end of the conduit 66 is coupled to the agitation port 40, and a second end of the conduit 66 is connected to the vapor return conduit 56 between the vapor pump 46 and the valve 60. A valve 68 is carried by the conduit 66, as is a restrictor 64.

A conduit 70 is connected to the conduit 56 between the valve 58 and the vapor pump 46. The conduit 70 carries valve 72 that can be selectively opened to place the vapor return conduit 56 in fluid communication with the atmosphere.

In operation, the oil purification system 10 is designed to be used on a periodic basis. In particular, the system 10 is used only when it is desired to change the oil in the compressor 22, when it is desirable to remove oil form the refrigerant system 12 with low refrigerant emisions, when it is desirable to process oil to remove entrained refrigerant, or when it is desirable to use the pump 46 to force oil from the tank 34 into another storage vessel. Accordingly, during normal operations of refrigeration system 12, the oil purification system 10 is isolated from the refrigeration system 12. This is accomplished by maintaining valve 50 and the valve 60 in their fully closed positions. The heater 44 and the vapor pump 46 are maintained in a nonpowered state.

Figure 2:
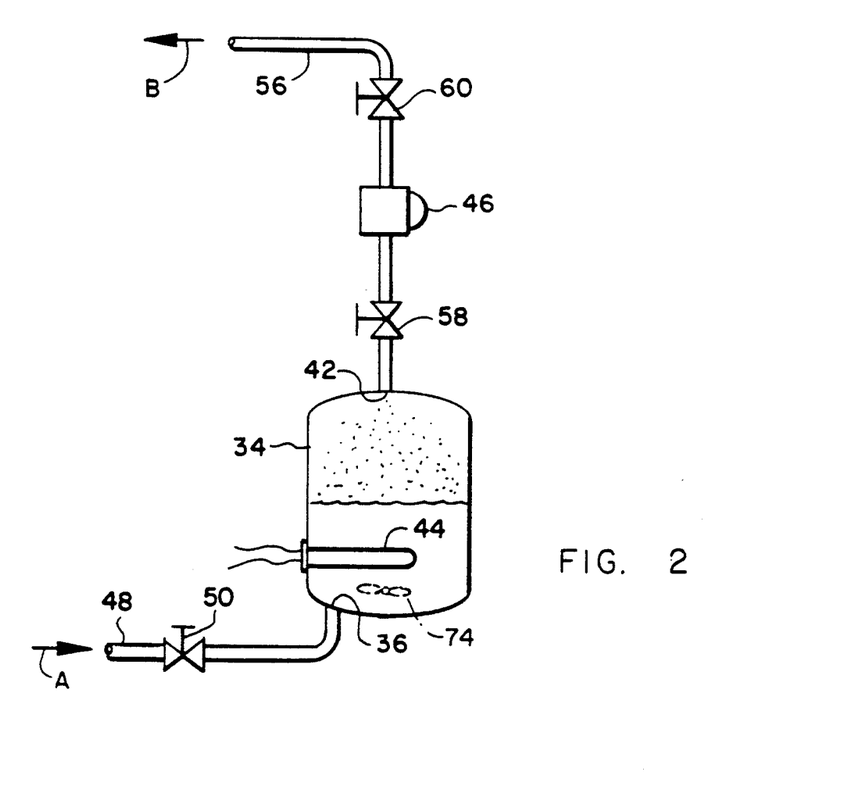
FIG. 2 is a schematic depiction of the oil purification apparatus configured to receive oil from the refrigeration system.

When it is desired to purify the lubricating oil, the drain valve 52 is closed. The valve 64, the valve 68, and the valve 72 are also closed. As depicted in the configuration of FIG. 2, the valve 50, the valve 58, and the valve 60 are opened. Lubricating oil, contaminated with entrained refrigerant, flows from the sump 32 through the conduit 48 as indicated by arrow A. The contaminated oil enters tank 34 through oil port 36. To assist the oil flowing into the tank 34, vapor pump 46 is energized drawing off any vapor at the top of tank 34 and pumping such vapor to the vapor side 18 of the evaporator 14, as indicated by arrow B. This equalizes the pressure in the tank 34, allowing the contaminated oil to enter the tank 34. The pressure exerted by the pumped off vapor may also cause the contaminated oil to enter the tank 34.

When the desired quantity of oil is contained in the tank 34, the valve 50 is closed. This stops the flow of oil into the oil purification system 10 from the refrigeration system 12. With a substantial portion of the oil removed from the refrigeration system 12, the refrigeration system 12 would not normally be operated.

Figure 3:
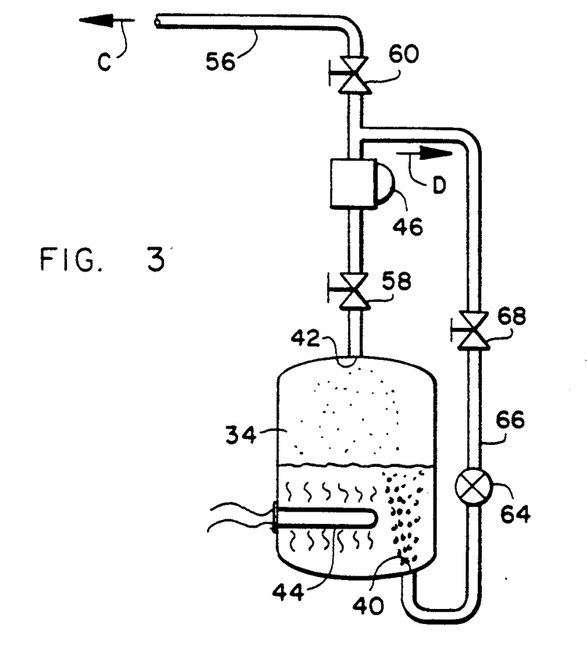
FIG. 3 is a schematic depiction of the oil purification apparatus configured to purge entrained refrigerant from the oil.

The next phase in the purification process is to separate the entrained refrigerant from the lubricating oil. The configuration of the oil purification system 10 for this phase is depicted in FIG. 3. The valves 58, 60 in the conduit 56 were opened in the first phase and are kept in the open configuration. The valve 68 in conduit 66 is opened. This provides a bifurcated vapor path to both the evaporator 14 and to the agitation port 40. The vapor pump 46 is placed in an operating state.

The heater 44 is then energized, heating the oil in the tank 34. The heating is sufficient to raise the temperature of the contaminated oil to the vaporization temperature of the refrigerant entrained in the oil, causing the entrained refrigerant to vaporize and boil out of the oil. It will be appreciated that commonly used refrigerants vaporize at relatively low temperatures. For example, the refrigerant R11 vaporizes at 74.8° F., and the refrigerant R123 vaporizes at 83.7° F. The heating effect of the heater 44 can accordingly be limited, and maintained well below the flash point of the lubricating oil.

The vapor pump 46 draws the reclaimed refrigerant vapor out of the tank 34 through the open valve 58. The majority of the reclaimed refrigerant vapor is pumped through the open valve 60 and the conduit 56 to the vapor portion 18 of the evaporator 14, as indicated by arrow C of FIG. 3 A smaller portion of the reclaimed refrigerant vapor is pumped through the conduit 66 and the open valve 68, as indicated by arrow D of FIG. 2. The restrictor 64 in the conduit 66 limits the amount of vapor passing through the conduit 66 as desired. The reclaimed refrigerant vapor that passes through the restrictor 64 is further pumped to the agitation port 40. The refrigerant vapor is admitted into the tank 34 and bubbles up through the oil in the tank 34. The bubbling effect of refrigerant vapor through the oil agitates the oil ensuring that the heat from the heater 44 is thorough and even throughout the contaminated oil. This combination of heating and agitation results in a maximized vaporization effect of the refrigerant that is entrained in the oil. Although the agitation of the oil is accomplished simply and economically through the use of refrigerant vapor, the agitation could also be accomplished through the use of a conventionally powered mechanical device such as a propeller 74 (shown in phantom outline in FIG. 2).

When the desired level of purity of the oil in the tank 34 is attained, the valves 58 and 60 in the conduit 56, and the valve 68 in the conduit 66 are closed. The heater 44 is de-energized.

Figure 4:
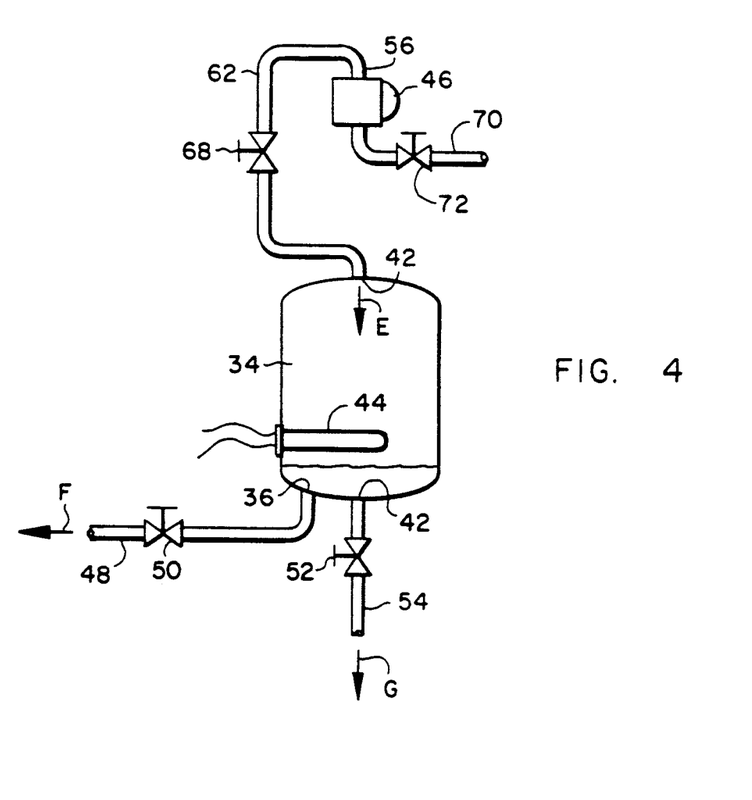
FIG. 4 is a schematic depiction of the oil purification apparatus configured to drain the purified oil from the apparatus.

The final phase of the purification process is the removal of the purified oil from the tank 34. As depicted in FIG. 4, this is accomplished by opening the valve 50 if it is desired to return the purified oil to the compressor 22 or, alternatively, opening the drain valve 52, if it is desired to drain the oil from the refrigeration system 12. To assist in evacuating the purified oil from the tank 34 through the drain valve 52, the valve 72 in the conduit 70 is opened. The vapor pump 46 is maintained in the energized state. The valve 68 in the conduit 62 is opened. This creates a loop in which the vapor pump 46 is pumping outside air under pressure through the conduit 62 into the tank 34, as indicated by arrow E of FIG. 4. This increased pressure in the tank 34 provides the motive force to pump the purified oil out of the drain port 42, as depicted by arrow G of FIG. 4.

When the purified oil has been removed from the tank 34, the oil purification system 10 is again returned to its state of isolation from the refrigeration system 12. This is accomplished by de-energizing the vapor pump 46. The valve 50, the drain valve 52, the valve 68, and the valve 72 are all closed, sealing the purification system 10 and isolating it from the refrigeration system 12.

Although a preferred embodiment of the present invention has been illustrated and described other embodiments will occur to those skilled in the art. It is therefore intended that the present invention is to be limited only by the scope of the appended claims.

What is claimed is:

1. An oil purification apparatus for use in conjunction with a refrigeration system, the refrigeration system including an evaporator where liquid refrigerant is evaporated to refrigerant vapor, a compress for pressurizing the refrigerant vapor, and a condenser for condensing pressurized refrigerant vapor to liquid refrigerant, the compressor having interacting moving parts and a quantity of lubricating oil for the lubrication thereof, the oil intermixing with the refrigerant during operation of the refrigeration system such that the refrigerant becomes entrained therein providing contaminated oil within the refrigeration system, the oil purification apparatus comprising:

isolation means, selectively and operably coupled to a removing means for receiving a portion of said quantity of contaminated oil therefrom and isolating said portion of said contaminated oil from the refrigeration system, the isolation means including tank means for holding the contaminated oil in isolation from the refrigeration system, said tank means being fluidly sealed and having a first port in selective, operable fluid communication with a removing means through which the contaminated oil is received into the tank and a second port disposed uppermost in the tank in selective, operable vapor communication with he vapor loop means for conveying said reclaimed refrigerant vapor to said refrigeration system;

removing means, selectively and operably connected to the refrigeration system, for removing contaminated oil form the refrigeration system, the removing means including a first conduit means for providing said fluid communication between the first port and the refrigeration system and a first valve means operably coupled to said first conduit means for selectively admitting contaminated oil from the refrigeration system to the tank means;

separation means, operably coupled to the isolation means, for substantially purifying said contaminated oil and reclaiming said entrained refrigerant by causing said entrained refrigerant to vaporize and separate from the contaminated oil providing reclaimed refrigerant vapor, the separation means including heater means, operably disposed in the tank means, for heating the contaminated oil whereby the refrigerant entrained in the contaminated oil is vaporized, and an agitation device for agitating the contaminated oil within said tank means;

vapor loop means, selectively and operably coupling the isolation means to the refrigeration system, for selectively conveying the reclaimed refrigerant vapor from the isolation means to the refrigeration system, the vapor loop means including a second conduit means for providing said vapor communication between the second port and the refrigeration system, second valve means operably coupled to said second conduit means for selectively conveying refrigerant vapor from the tank means to the refrigeration system, and a vapor pump operably coupled to the second conduit means for drawing reclaimed refrigerant vapor from the tank means;

drain means for draining off the purified oil from the tank means, the drain means including a drain port in the tank means, a drain conduit in fluid communication with the drain port, and a valve selectively, operably coupled to the drain conduit and the vapor pump for pumping outside air under pressure into the tank means to pump purified oil out of the drain port; and selective configuration means, operatively associated with the removing means, the isolation means, the separation means, the vapor loop means, and the drain means, for selectively configuring the operation of the removing means, the isolation means, the separation means, the vapor loop means, and the drain means.

2. An oil purification apparatus for use in conjunction with a refrigeration system, the refrigeration system including an evaporator where liquid refrigerant is evaporated to refrigerant vapor, a compressor for pressurizing the refrigerant vapor, and a condenser for condensing pressurized refrigerant vapor to liquid refrigerant, the compressor having interacting moving parts and a quantity of lubricating oil for the lubrication thereof, the oil intermixing with the refrigerant during operation of the refrigeration system such that the refrigerant becomes entrained therein providing contaminated oil within the refrigeration system, the oil purification apparatus comprising:

isolation means, selectively and operably coupled to a removing means for receiving a portion of said quantity of contaminated oil therefrom and isolating said portion of said contaminated oil from the refrigeration system, the isolation means including tank means for holding the contaminated oil in isolation from the refrigeration system, said tank means being fluidly sealed and having a first port in selective, operable fluid communication with a removing means through which the contaminated oil is received into the tank and a second port disposed uppermost in the tank in selective, operable vapor communication with he vapor loop means for conveying said reclaimed refrigerant vapor to said refrigeration system;

removing means, selectively and operably connected to the refrigeration system, for removing contaminated oil form the refrigeration system, the removing means including a first conduit means for providing said fluid communication between the first port and the refrigeration system and a first valve means operably coupled to said first conduit means for selectively admitting contaminated oil from the refrigeration system to the tank means;

separation means, operably coupled to the isolation means, for substantially purifying said contaminated oil and reclaiming said entrained refrigerant by causing said entrained refrigerant to vaporize and separate from the contaminated oil providing reclaimed refrigerant vapor, the separation means including heater means, operably disposed in the tank means, for heating the contaminated oil whereby the refrigerant entrained in the contaminated oil is vaporized, and an agitation device for agitating the contaminated oil within said tank means;

vapor loop means, selectively and operably coupling the isolation means to the refrigeration system, for selectively conveying the reclaimed refrigerant vapor from the isolation means to the refrigeration system, the vapor loop means including a second conduit means for providing said vapor communication between the second port and the refrigeration system, second valve means operably coupled to said second conduit means for selectively conveying refrigerant vapor from the tank means to the refrigeration system, and a vapor pump operably coupled to the second conduit means for drawing reclaimed refrigerant vapor from the tank means;

drain means for draining off the purified oil from the tank means, the drain means including a drain port in the tank means, a drain conduit in fluid communication with the drain port, and a valve selectively, operably coupled to the drain conduit and the vapor pump for pumping outside air under pressure into the tank means to pump purified oil out of the drain port; and selective configuration means, operatively associated with the removing means, the isolation means, the separation means, the vapor loop means, and the drain means, for selectively configuring the operation of the removing means, the isolation means, the separation means, the vapor loop means, and the drain means.

wherein the agitation means include agitation loop means for bubbling a portion of the reclaimed refrigerant vapor through the contaminated oil, including a third port disposed lowermost in the tank means, a third conduit means for operably coupling the third port to the second port, a third valve means operably carried by the third conduct means for selectively communicating a portion of said reclaimed refrigerant through said third conduit means to the third port.

3. The oil purification apparatus as claimed in claim 2, wherein the agitation loop means includes fluid restrictor means operably carried by the third conduit means for limiting the amount of reclaimed refrigerant vapor admitted through the third port to the tank means independent of the opening of the third valve means.

4. The oil purification apparatus as claimed in claim 1 wherein the agitation device includes a mechanical device such as a propeller.

5. The oil purification apparatus as claimed in claim 1, further comprising atmospheric vent means selectively, operably coupled to the tank means for pressurizing atmospheric pressure to the tank means, equalizing the pressure therein while draining off the purified oil.

6. A method of purifying contaminated oil for use in a refrigeration system, the refrigeration system including an evaporator where liquid refrigerant is evaporated to refrigerant vapor, a compressor for pressurizing the refrigerant vapor, and a condenser for condensing pressurized refrigerant vapor to liquid refrigerant, the compressor having interacting moving parts and a quantity of lubricating oil for the lubrication thereof, the oil intermixing with the refrigerant during operation of the refrigeration system such that the refrigerant becomes entrained therein presenting said contaminated oil, the oil purification method comprising the steps of:

attaching a sealed vessel between the compressor and the evaporator;

removing a quantity of contaminated oil from the refrigeration system to the sealed vessel and isolating the vessel from the refrigeration system;

heating the contaminated oil within the vessel to cause vaporization of the entrained refrigerant thereby providing reclaimed refrigerant vapor within the vessel;

agitating the contaminated oil while the oil is being heated to promote even heating of the oil and thorough vaporization of the entrained refrigerant;

evacuating the reclaimed refrigerant vapor from the sealed vessel by pumping the reclaimed refrigerant vapor therefrom;

returning the reclaimed refrigerant vapor to the refrigeration system;

draining purified oil from the sealed vessel; and detaching the sealed vessel from the compressor and the evaporator.

7. The method of purifying oil as claimed in claim 6, further comprising the step of:

agitating the contaminated oil by bubbling a portion of the reclaimed refrigerant up through the contaminated oil while the oil is being heated.

8. The method of purifying oil as claimed in claim 6 further comprising the step of:

agitating the contaminated oil with a mechanical device such as a propeller.

9. An oil purification device for a refrigeration system which includes an evaporator and a compressor, the oil purification device comprising:

means, operably connected to the compressor, for removing a refrigerant containing lubricant mixture from the compressor;

means, operably connected to the evaporator, for returning a refrigerant vapor to the evaporator;

an isolation tank, operably and removably connected tot the removing means and the return means, for receiving the lubricant mixture;

an agitation device the lubricant mixture in the isolation tank;

means, associated with the isolation tank, for purifying the lubricant mixture to a desired level of purity by boiling off the refrigerant and directing the resulting refrigerant vapor to the returning means;

means for forcing purified lubricant from the isolation tank; and means for selectively configuring the functions of the removing means, the return means, the agitating means, the purifying means, and the forcing means.

10. The oil purification device of claim 9 wherein the purifying means includes a heating element externally attached to the isolation tank.

11. The oil purification device of claim 9 wherein the purifying means includes a heating element internally attached to the isolation tank.

12. The oil purification device of claim 11 wherein the removing means further includes first means for selectively conveying the lubricant mixture, and wherein the returning means further includes second means for selectively conveying refrigerant vapor.

13. The oil purification device of claim 9 wherein the agitation device includes a mechanical device such as a propeller.

* * * * *

UNITED STATES PATENT AND TRADEMARK OFFICE
CERTIFICATE OF CORRECTION

PATENT NO. : 5,265,432            Page 1 of 2

DATED : November 30, 1993

INVENTOR(S) : Gary L. Luepke and Allen J. Dietrich

It is certified that error appears in the above-identified patent and that said Letters Patent is hereby corrected as shown below:

Column 1, Line 26, after the word "condenser" insert --,--.

Column 1, Line 38, after "ation" insert --.--.

Column 1, Line 47, after the word "compressor" insert --.--.

Column 2, Line 2, after the word "century" insert --.--.

Column 3, Line 15, after the word "means" delete [.] and insert --,--.

Column 3, Line 50, after the word "evaporator" delete [.] and insert --,--.

Column 5, Line 32, after "38" insert --.--.

Claim 1, Column 7, Line 42, "compress" should read --compressor--.

Claim 2, Column 9, Line 10, "he" should read --the--.

Claim 2, Column 9, Line 15, "form" should read --from--.

Claim 5, Column 10, Line 18, "pressurizing" should read --presenting--.

UNITED STATES PATENT AND TRADEMARK OFFICE
CERTIFICATE OF CORRECTION

PATENT NO. : 5,265,432

DATED : November 30, 1993

INVENTOR(S) : Gary L. luepke, et. al.

It is certified that error appears in the above-indentified patent and that said Letters Patent is hereby corrected as shown below:

Claim 9, Column 11, Line 5, "tot" should read --to--.

Signed and Sealed this

Seventeenth Day of May, 1994

*Attest:*

BRUCE LEHMAN

*Attesting Officer*     *Commissioner of Patents and Trademarks*